United States Patent [19]

Croswhite et al.

[11] 4,173,270

[45] Nov. 6, 1979

[54] HYDROKINETIC TORQUE CONVERTER WITH A DIRECT DRIVE LOCK-UP CLUTCH ADAPTED FOR ONE-WAY TORQUE DELIVERY

[75] Inventors: Howard L. Croswhite; James H. Gregg, both of Livonia; Angelo L. Guido, Dearborn, all of Mich.

[73] Assignee: Ford Motor Company, Dearborn, Mich.

[21] Appl. No.: 851,005

[22] Filed: Nov. 14, 1977

[51] Int. Cl.² .................... F16D 33/00; F16H 47/00
[52] U.S. Cl. .................................. 192/3.29; 74/645
[58] Field of Search ............ 74/645; 192/3.28, 3.29, 192/3.3, 3.31, 3.32, 3.33

[56] References Cited

U.S. PATENT DOCUMENTS

| | | | |
|---|---|---|---|
| 2,442,840 | 6/1948 | Carnagua | 192/3.29 X |
| 2,613,503 | 10/1952 | Syrovy | 192/3.3 X |
| 2,623,411 | 12/1952 | Herndon | 192/3.3 X |
| 2,632,539 | 3/1953 | Black | 192/3.3 X |
| 2,749,775 | 6/1956 | Simpson | 192/3.28 X |
| 3,184,019 | 5/1965 | LeBrise | 192/3.32 |
| 3,252,352 | 5/1966 | General et al. | 192/3.29 X |
| 4,027,757 | 6/1977 | Radke et al. | 192/3.29 X |
| 4,044,556 | 8/1977 | Kuramochi et al. | 192/3.28 X |

FOREIGN PATENT DOCUMENTS 785924 11/1957 United Kingdom .................. 192/3.28

Primary Examiner—C. J. Husar
Assistant Examiner—Lance W. Chandler
Attorney, Agent, or Firm—Donald J. Harrington; Keith L. Zerschling

[57] ABSTRACT

A hydrokinetic torque converter mechanism for use in an automotive vehicle driveline comprising a bladed impeller, a bladed turbine and a bladed stator situated in toroidal fluid flow relationship, an impeller housing surrounding the bladed members, a lock-up clutch structure in said housing adapted to establish a direct connection between said impeller and said turbine, said turbine being connected to a turbine shaft that in turn is connected to torque input elements of a multiple ratio gear system, a one-way coupling located between said turbine shaft and said clutch structure for accommodating transfer of torque from said impeller to said turbine shaft but preventing torque transfer in the opposite direction thereby allowing coast braking of the driveline as the turbine tends to overrun the impeller but permitting direct mechanical torque transfer from the impeller to the turbine shaft during normal torque delivery, the driveability during coasting thereby being improved.

6 Claims, 2 Drawing Figures

HYDROKINETIC TORQUE CONVERTER WITH A DIRECT DRIVE LOCK-UP CLUTCH ADAPTED FOR ONE-WAY TORQUE DELIVERY

GENERAL DESCRIPTION OF THE INVENTION

Our invention comprises a hydrokinetic torque converter for use with multiple ratio gearing in an automotive vehicle driveline. It is adapted especially to be used with a converter of the type shown in U.S. Pat. No. 3,252,352, which is assigned to the assignee of this invention.

The hydrokinetic torque converter includes a mechanical clutch located within the impeller housing. The clutch comprises a clutch disc situated between the turbine and the adjacent wall of the impeller housing. When fluid is circulated through the converter in a radially outward direction across the friction surface of the clutch disc, the clutch is released. If the direction of the fluid pressure delivery for the torus circuit is reversed, circuit pressure exerts a clutch applying force on the clutch disc thereby causing the impeller and the turbine to be locked together for rotation in unison. The impeller thus is connected to the turbine shaft of the converter through the mechanical clutch and that connection includes a dampening device. It is necessary in an arrangement of this type to avoid a condition in which the drive shaft of the driveline drives the engine because the engine during coasting is subject to misfire and transient torque fluctuations to provide undesirable driveability. Also, during normal forward driving under torque the engine may be subject to transient torque fluctuations which would be much more noticeable if the drive shaft were to be connected directly to the impeller housing through the clutch without provision for avoiding torque reversals. Accordingly, we have provided a means for allowing the turbine to overspeed the impeller during coasting operation with the transmission mechanism conditioned for direct drive. This feature is achieved by using a one-way clutch connection between an engageable clutch disc and the turbine shaft which allows for direct torque delivery from the impeller through the clutch disc to the turbine during normal torque delivery, thus bypassing the hydrokinetic torque delivery path of the converter but interrupting torque delivery from the turbine shaft to the impeller through the clutch disc during coasting operation while permitting a coast braking torque delivery path through the hydrokinetic unit.

PARTICULAR DESCRIPTION OF THE INVENTION

Figure 1:
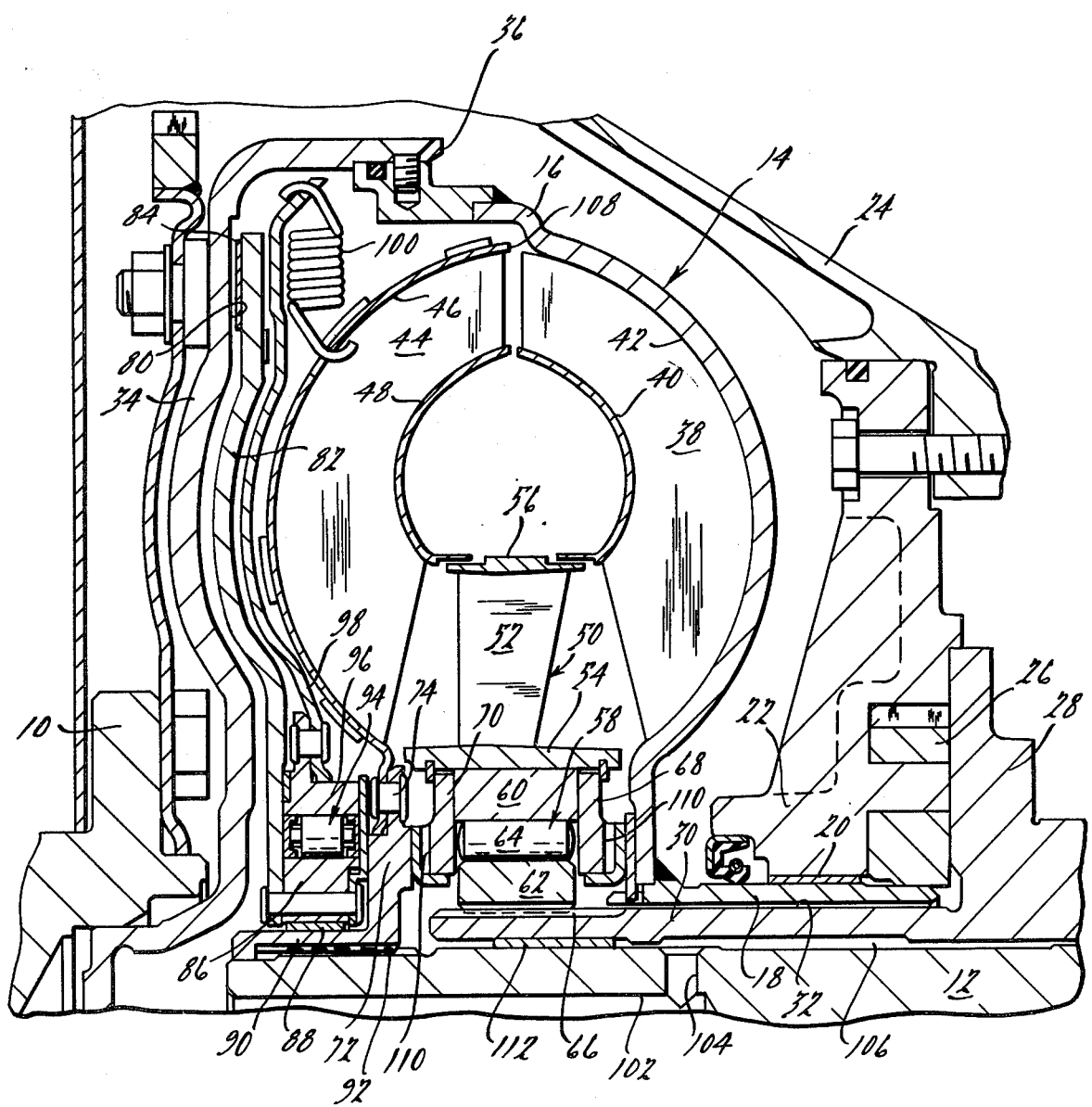
FIG. 1 is a cross-sectional view of a first embodiment of my invention, which includes a torque converter with a clutch located within the housing of the converter and an overrunning clutch between the clutch and the turbine shaft.

In FIG. 1 numeral 10 designates a flange on the crankshaft of an internal combustion engine. Numeral 12 designates a turbine shaft which is adapted to be connected to the torque input element of a multiple ratio gear system of an automotive vehicle driveline. A hydrokinetic torque converter 14 provides a hydrokinetic torque delivery path between the crankshaft flange 10 and the turbine shaft 12.

The torque converter 14 includes an impeller shell or housing 16 formed in the shape of a semi-torus. It is provided with a hub 18 journalled by bushing 20 in a bearing support wall 22 that forms a part of the automatic transmission housing 24. A support wall 22 defines a pump cavity for receiving pumping gear elements 26 which are connected drivably to the hub 18. A stator support 28 secured to the wall 22 includes a stator sleeve shaft 30. The annular space 32 between the impeller hub 18 and the sleeve shaft 30 defines a fluid flow path for feeding fluid to the torus circuit of the converter 14.

The impeller housing 16 includes an end wall 34 which is secured at its periphery 36 to the impeller housing and which forms an integral part of the clutch and which forms a part of the housing.

The impeller housing carries impeller blades 38 which cooperate with inner shroud 40 and the interior wall 42 of the impeller housing to define radial outflow passages. Turbine blades 44 cooperate with an outer turbine shroud 46 and an inner turbine shroud 48 to define radial inflow passages, the impeller passages and the turbine passages defining a part of the torus circuit.

A bladed stator 50 is situated between the flow exit region of the turbine blades 44 and the flow entrance region of the impeller blades 38. Stator 50 includes radially disposed blades 52 secured to hub 54. A stator shroud 56 surrounds the blades 52.

An overrunning brake 58 located within the hub 54 includes an outer race 60, an inner race 62 and intermediate clutch rollers 64 located between the races. The race 60 is provided with cam surfaces that are engaged by the rollers 64 to lock the races together when race 60 tends to rotate relative to race 62 in one direction and to prevent freewheeling motion of race 60 relative to race 62 in the opposite direction. Race 62 is splined at 66 to the stator sleeve shaft 30.

A thrust ring 68 is situated on one side of the races 60 and 62 adjacent the radially inward portion of the impeller housing 16. Another thrust ring 70 is located on the opposite side of the races 60 and 62 directly adjacent the turbine hub 72, which is connected drivably to the clutch race 46 as shown at 74. Although this connection 74 is in the form of rivets, other types of connections may be used.

The housing wall 34 has an annular friction surface 80 located at a radially outward location. A clutch disc 82 is located adjacent the wall 34 and it is provided with an annular friction surface 84 at a radially outward location adjacent the surface 80. Disc 82 is provided with a hub 86 which is piloted by bushing 88 on a cylindrical extension 90 of the clutch hub 72. Extension 90 is splined at 92 to the turbine shaft 12. A hub 86 forms the inner race for an overrunning clutch identified generally by reference numeral 94. Brake 94 includes also an outer race 96 which is connected to the center of a clutch damper disc 98, the outer periphery of which is joined by springs 100 to the shroud 46 of the turbine 44. Several springs 100 are provided at angularly spaced locations to provide a resilient connection between the periphery of the disc 98 and the turbine. This provides a cushioning action for the driveline when the turbine and the impeller are locked together by the internal clutch structure to provide a 1:1 mechanical driving connection through the hydrokinetic unit.

The turbine shaft 12 is provided with a central opening 102 which is connected through radial passages 104 to the annular space 106 between the stator sleeve shaft 30 and the shaft 12. That space serves as a fluid flow path for the fluid that is fed to the torus circuit of the converter.

Fluid supplied through the passage 106 is distributed to passage 102, then to the space between the housing wall 34 and the clutch disc 82. The fluid then passes across the friction surfaces 80 and 84 and then to the interior of the torus circuit through the gap between the flow entrance section of the turbine and the flow exit section of the impeller. That gap is identified in FIG. 1 by reference character 108.

Fluid is returned, after circulating through the torus circuit, in a radially inward direction through flow return passages 110 formed in the thrust disc 68 of the stator assembly. It then circulates through the annular flow passage 32. When the direction of fluid flow through the torus circuit is reversed (that is, when the annular passage 106 is connected to a low pressure region and the annular passage 32 serves as a fluid feed passage), the static pressure in the torus circuit tends to urge the clutch disc 82 into frictional engagement with the impeller housing. The pressure drop across the fluid flowing past friction surfaces 80 and 84 tends to trigger the application of the clutch disc 82. Thereafter as the torque converter is locked up and the impeller and turbine rotate in unison, only a minimum flow through the circuit is required to maintain lubrication and cooling. That minimum flow occurs by reason of the flow circuit provided by radial passages 110 in the stator thrust ring 70 and the flow across bushing 112 located between the stator sleeve shaft and the turbine shaft 12.

When the clutch is disengaged by supplying fluid through the annular passage 106, the converter acts in the usual fashion and both the friction clutch and the overrunning clutch 94 are ineffective. Upon a reversal in the fluid delivery to the torus circuit, however, the clutch becomes engaged to provide a direct mechanical connection between the crankshaft and the turbine shaft. This mechanical connection is in parallel relationship with respect to the hydrokinetic torque flow path through the converter. Upon a torque reversal or when the vehicle is coasting with the turbine shaft tending to run faster than the crankshaft, the overrunning clutch tends to freewheel if the lock-up clutch is engaged. Thus the turbine is allowed to run faster than the impeller to permit hydrokinetic braking in the usual way as the mechanical torque delivery path between the engine and the vehicle wheels is interrupted. If the engine happens to misfire during coasting, an undesirable torque surge in the driveline is avoided. Also the engine calibration for maintaining optimum exhaust gas emission levels for the engine is not affected adversely. Transient torque variations in the engine under coasting conditions are not felt by the operator of the vehicle or the passengers since they will be adequately cushioned because of the cushioning action inherent in the hydrokinetic torque delivery path that is established during coasting.

Figure 2:
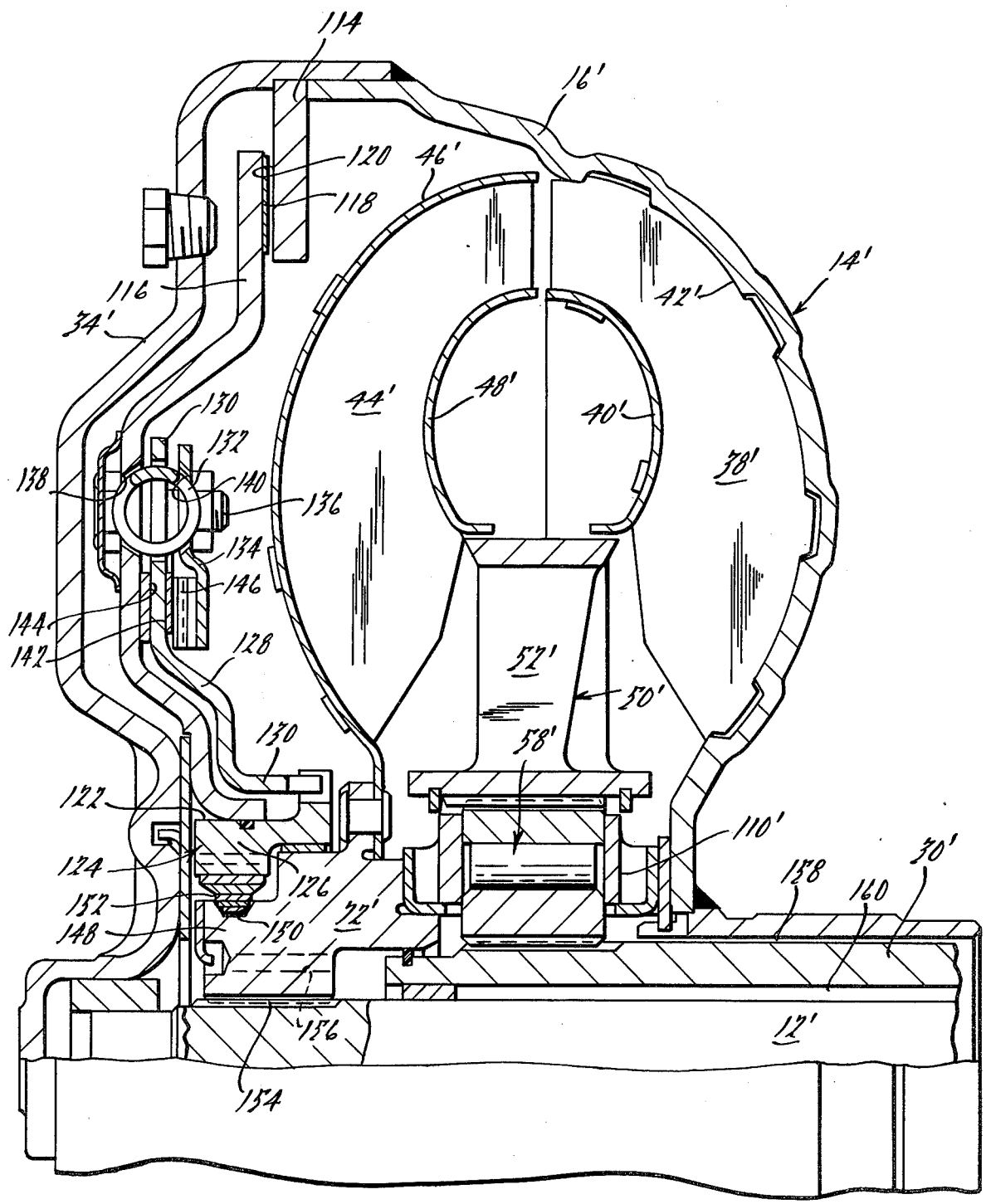
FIG. 2 is similar to FIG. 1 but it shows an alternate embodiment of the invention.

In FIG. 2 we have illustrated another embodiment of our invention. The improvements of our invention are adapted in the FIG. 2 arrangement to a hydrokinetic torque converter in which a lock-up clutch acts in a direction opposite to the direction that the clutch of FIG. 1 acts. Also the direction of torus feed through the circuit of FIG. 2 is in a direction opposite to the direction of the torus feed through the circuit of FIG. 1.

Many of the elements of the assembly of FIG. 2 have a counterpart in the assembly of FIG. 1, and these have been identified by the same reference characters although in FIG. 2 prime notations are added to the reference numerals. Those elements will not be described in particular in this description.

The impeller 16' of FIG. 2 has formed therein at its outer periphery an annular clutch disc 114 located within the interior of the housing. A clutch disc 116 situated between the turbine shroud 46' and the wall 34' of the housing 16' carries a friction surface on its periphery as shown at 118. This is situated in juxtaposed, adjacent relationship with respect to friction surface 120 of the clutch disc 114.

The hub of clutch disc 116 is piloted on cylindrical surface 122 of an overrunning clutch 124. The clutch 124 includes an outer race 126 that is keyed or is otherwise drivably connected to the hub of drive plate 128, as shown at 130. Drive plate 128 has radial projections 130 that extend between each of a pair of a plurality of compression springs 132. These springs are carried in cooperating openings formed in clutch disc 116 and damper plate 134, the latter being joined to the clutch plate 116 by drive bolts 136. The openings in the clutch disc 116 and the damper plate 134 are shown, respectively, at 138 and 140. Limited angular displacement between the disc 116 and the damper plate 128 is accommodated by the connection that includes in part the springs 132. Friction damping is achieved by the friction surfaces 142 and 144 formed on either side of the damper plate 128. Friction surfaces are urged normally to an active frictional damping condition by an annular compression spring 146 carried by the damper plate 128. Reference may be made to U.S. Pat. Nos. 2,318,620; 2,042,570 and 2,687,627 for examples of friction clutch dampers used in other environments.

Clutch hub 72' includes an extension 148 in which is formed an annular tapered clutch groove 150. A multiple wrap spring band 152 is disposed within the groove 150 and its outward winding is secured to the outer race 126. The free end of the band and the windings of the band intermediate its ends, which are of progressively decreasing width, have their edges engageable with the sides of the groove 150 thereby establishing a clutching action between the race 148 and the band when the race 148 tends to rotate in one direction relative to the race 126. When the race 148 tends to move in the opposite direction relative to the race 126, the bands become unlocked from the sides of the groove 150 permitting freewheeling to occur between the races.

Clutch hub 72 is splined as shown at 154 to turbine shaft 12'. Hub 72' is provided with axially directed flow passages 156 which serve as a flow return passage for the torus circuit fluid. Fluid is fed to the torus circuit through annular space 158 and through radial passages 110'. Fluid then passes across the friction surfaces 118 and 120 to disengage the converter clutch. The fluid is returned in a radially inward direction through the space between the wall 34' and the clutch discs 116'. It then passes through axially directed passages 156 to the flow return passage 160 defined by the annular space between the stator sleeve shaft 30' and the turbine shaft 12'. When the direction of pressure distribution to the torus circuit is reversed, the annular flow passage 158 is connected to a low pressure region and passage 160 is pressurized. The pressure drop that tends to occur as fluid passes across the friction surfaces 118 and 120 triggers the application of the clutch and the clutch then engages by reason of the static pressure between the wall 34' and the clutch disc 116'. After the clutch then becomes engaged, the converter is locked up and the resulting mechanical torque flow path bypasses the hydrokinetic torque flow path. Engagement of the clutch is cushioned by the springs 132 and damping of torsional fluctuations is achieved by the damper assembly. If coasting occurs with the clutch engaged, the overrunning clutch will act in the same fashion as the overrunning clutch 94 of the embodiment of FIG. 1.

Having thus described preferred forms of our invention, what we claim and desire to secure by U.S. Letters Patents is:

1. A hydrokinetic torque transmitting mechanism for use in an automotive vehicle driveline comprising a hydrokinetic torque converter having a bladed impeller and a bladed turbine situated in toroidal fluid flow relationship, said impeller being adapted to be connected to an internal combustion engine, a turbine shaft connected to said turbine and adapted to be connected to the torque input element of multiple ratio gearing, a selectively engageable friction clutch means for establishing a direct drive connection between said impeller and said turbine shaft, thus establishing a mechanical torque flow path that is in parallel disposition with respect to the hydrokinetic torque flow path through said hydrokinetic mechanism, and a one-way overrunning clutch situated in and forming part of said mechanical torque delivery path for accommodating torque delivery from said impeller to said turbine shaft but adapted to interrupt torque delivery from the turbine shaft to the impeller, said friction clutch means having a torque input element connected continuously to said impeller, said overrunning clutch having a torque input element connected continuously to a torque output element of said friction clutch means, said overrunning clutch having also a torque output element connected to said turbine and an overrunning coupling element between said torque input element and said torque output element of said overrunning clutch adapted to establish a continuous, one-way torque delivery path from said impeller to said turbine upon engagement of said friction clutch means at any turbine speed.

2. A hydrokinetic torque transmitting mechanism for use in an automotive vehicle driveline having an internal combustion engine and multiple ratio gearing, said hydrokinetic mechanism comprising a bladed impeller and a bladed turbine arranged in toroidal fluid flow relationship in a torus circuit, a turbine shaft connected to said turbine and adapted to be connected to a torque input element of said multiple ratio gearing, said hydrokinetic mechanism comprising an impeller housing surrounding said turbine, said housing being adapted to be connected to said internal combustion engine, a friction clutch in said housing including a first friction element carried by said housing and a second friction element connected to said turbine, said friction elements having adjacent friction surfaces, passage means for distributing fluid pressure to one side of said second friction element for creating a static fluid pressure thereon to engage said friction surfaces thus establishing a driving mechanical connection between said impeller and said turbine, the connection between said second friction element and said turbine being defined in part by an overrunning clutch adapted for torque delivery between said turbine and said impeller in one direction while permitting freewheeling motion therebetween when said turbine tends to overrun said impeller, the torque delivery path from the engine to the multiple ratio gearing being fully hydrokinetic when said friction surfaces are disengaged and fully mechanical when said friction surfaces are engaged, the mechanical torque delivery path bypassing the hydrokinetic torque delivery path, said mechanical torque delivery path, during friction clutch engagement, being interrupted when said turbine overruns said impeller, regardless of the turbine speed, said friction clutch having a torque input element connected continuously to said impeller, said overrunning clutch having a torque input element connected continuously to a torque output element of said friction clutch, said overrunning clutch having also a torque output element connected to said turbine and an overrunning coupling element between said torque input element and said torque output element of said overrunning clutch adapted to establish a torque delivery path from said impeller to said turbine upon engagement of said friction clutch at any turbine speed.

3. The combination as set forth in claim 2 wherein the passage means for delivering pressure to one side of said second friction element includes an annular flow passage surrounding said turbine shaft, said turbine including a turbine hub connected to said turbine shaft, said annular passage including also an axial flow passage formed in said hub which communicates with the space between said housing wall and said second friction element.

4. The combination as set forth in claim 2 wherein the connection between said second friction element and said turbine includes a torque cushioning and damper assembly means for cushioning torque variations during the application of said friction surfaces and for dampening torque fluctuations in the mechanical torque delivery path during and following engagement of said clutch.

5. The combination as set forth in claim 3 wherein the connection between said second friction element and said turbine includes a torque cushioning and damper assembly means for cushioning torque variations during the application of said friction surfaces and for dampening torque fluctuations in the mechanical torque delivery path during and following engagement of said clutch.

6. A hydrokinetic torque transmitting mechanism for use in an automotive vehicle driveline comprising a hydrokinetic torque converter having a bladed impeller and a bladed turbine situated in toroidal fluid flow relationship, said impeller being adapted to be connected to an internal combustion engine, a turbine shaft connected to said turbine and adapted to be connected to the torque input element of multiple ratio gearing, a friction clutch means for establishing a direct drive connection between said impeller and said turbine shaft, thus establishing a mechanical torque flow path that is in parallel disposition with respect to the hydrokinetic torque flow path through said hydrokinetic mechanism, and a one-way overrunning clutch situated in and forming part of said mechanical torque delivery path for accommodating torque delivery from said impeller to said turbine shaft but adapted to interrupt torque delivery from the turbine shaft to the impeller, said friction clutch means having a torque input element connected continuously to said impeller, said overrunning clutch having a torque input element connected continuously to a torque output element of said friction clutch means, said overrunning clutch having also a torque output element connected to said turbine and an overrunning coupling element between said torque input element and said torque output element of said overrunning clutch adapted to establish a continuous, one-way torque delivery path from said impeller to said turbine upon engagement of said friction clutch means at any turbine speed.

* * * * *